United States Patent
Hiraoka

(10) Patent No.: US 9,340,188 B2
(45) Date of Patent: May 17, 2016

(54) OCCUPANT PROTECTIVE APPARATUS AND PEDESTRIAN PROTECTIVE APPARATUS

(75) Inventor: Yuji Hiraoka, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 1739 days.

(21) Appl. No.: 12/527,552

(22) PCT Filed: Jan. 10, 2008

(86) PCT No.: PCT/JP2008/050200
§ 371 (c)(1),
(2), (4) Date: Aug. 17, 2009

(87) PCT Pub. No.: WO2008/139743
PCT Pub. Date: Nov. 20, 2008

(65) Prior Publication Data
US 2010/0057289 A1    Mar. 4, 2010

(30) Foreign Application Priority Data
May 10, 2007    (JP) ................................. 2007-125902

(51) Int. Cl.
*G01P 21/00* (2006.01)
*G06F 17/00* (2006.01)
*B60R 21/34* (2011.01)
*B60T 8/88* (2006.01)
*B60R 21/0132* (2006.01)
*B60R 21/01* (2006.01)

(52) U.S. Cl.
CPC ............. *B60T 8/885* (2013.01); *B60R 21/0132* (2013.01); *B60R 2021/01184* (2013.01); *B60T 2270/406* (2013.01)

(58) Field of Classification Search
CPC ............ B60R 2021/01122; B60R 2021/01129; B60R 2021/0117; B60R 2021/01184; B60R 2021/0119; B60R 2021/01197; B60R 21/0173; B60R 21/0132; B60T 2270/406; B60T 8/88
USPC ....................................................... 701/31, 45
See application file for complete search history.

(56) References Cited

U.S. PATENT DOCUMENTS

| | | | |
|---|---|---|---|
| 4,873,452 A | 10/1989 | Morota et al. | |
| 4,950,914 A | 8/1990 | Kurihara et al. | |
| 5,014,810 A | 5/1991 | Mattes et al. | |
| 5,883,442 A * | 3/1999 | Saito ........................... | 307/10.1 |
| 6,274,948 B1 | 8/2001 | Blank et al. | |

(Continued)

FOREIGN PATENT DOCUMENTS

| | | |
|---|---|---|
| DE | 39 24 507 A1 | 8/1990 |
| DE | 197 40 019 A1 | 3/1999 |

(Continued)

*Primary Examiner* — Mussa A Shaawat
*Assistant Examiner* — Kyung Kim
(74) *Attorney, Agent, or Firm* — Birch, Stewart, Kolasch & Birch, LLP

(57) ABSTRACT

A vehicle state detecting device 1 includes a sensor section (acceleration sensor 11) for detecting the behavior of a vehicle; an integration processing section (integrating circuit 12) for generating an output signal indicating a state of the vehicle by integrating physical quantity based on the sensor output; and a diagnostic section 2 for supplying the sensor section with a self-driving signal, and for carrying out self-diagnosis of the sensor section by comparing the output signal from the integration processing section with upper and lower permissible limits preset for the output signal.

10 Claims, 4 Drawing Sheets

(56) References Cited

U.S. PATENT DOCUMENTS

| | | |
|---|---|---|
| 6,530,597 B1 | 3/2003 | Nesper et al. |
| 2002/0169535 A1 | 11/2002 | Imai et al. |
| 2002/0173886 A1 | 11/2002 | Roelleke |
| 2004/0210368 A1 | 10/2004 | Ide et al. |
| 2006/0032311 A1 * | 2/2006 | Nozoe et al. ............ 73/527 |

FOREIGN PATENT DOCUMENTS

| | | |
|---|---|---|
| DE | 197 40 021 A1 | 3/1999 |
| DE | 100 33 907 A1 | 1/2002 |
| DE | 103 08 652 A1 | 9/2004 |
| DE | 100 27 184 B4 | 6/2005 |
| JP | 63-241467 A | 10/1988 |
| JP | 1-168545 A | 7/1989 |
| JP | 5-319201 A | 12/1993 |
| JP | 5-319204 A | 12/1993 |
| JP | 5-322925 A | 12/1993 |
| JP | 7-9664 U | 2/1995 |
| JP | 8-230610 A | 9/1996 |
| JP | 11-83891 A | 3/1999 |
| JP | 2002-331905 A | 11/2002 |
| JP | 2004-322673 A | 11/2004 |
| JP | 2005-283486 A | 10/2005 |
| WO | WO 00/13944 A1 | 3/2000 |

* cited by examiner

Setting Examples of Self-Driving

| | Driving Intensity And Driving Duration | Integral Value of Self-driving | Operating Threshold of Occupant Protective Apparatus |
|---|---|---|---|
| Conventional Example | 5G - 5ms | 0.9 km/h | 30 km/h or More |
| Embodiments 1~3 | 50G - 20ms | 35 km/h | |

OCCUPANT PROTECTIVE APPARATUS AND PEDESTRIAN PROTECTIVE APPARATUS

TECHNICAL FIELD

The present invention relates to a vehicle state detecting device for detecting the behavior of a vehicle and an occupant protective apparatus having the same device.

BACKGROUND ART

In an air bag system of a vehicle, an acceleration sensor (also abbreviated to "sensor" sometimes from now on) is used for collision detection, and generally, the acceleration sensor for an air bag has a self-diagnostic function, which decides the presence or absence of a fault by electrically driving the acceleration sensor at power-on and by obtaining an output response thereto.

As for the self-diagnostic technique of the sensor, there are many patent applications conventionally. For example, the following are known: an acceleration sensor that conducts a diagnosis whether the sensor is operating normally by carrying out pulsatile self-driving and by making a decision as to whether the sensor output during the driving is contained within a prescribed threshold (see Patent Document 1, for example); an impact detecting device that carries out a self-diagnosis of an impact detecting system including a filter circuit using the self-diagnostic function of an acceleration sensor (see Patent Document 2, for example); and a sensor system that makes a self-diagnosis by comparing two sensors (see Patent Document 3, for example).

Patent Document 1: Japanese Patent Laid-Open No. 5-322925/1993

Patent Document 2: Japanese Patent Laid-Open No. 11-83891/1999

Patent Document 3: Japanese Patent Laid-Open No. 2005-283486.

However, according to the technique disclosed in the foregoing Patent Document 1, if an input affecting the sensing is applied from outside during the self-diagnosis, it cannot obtain a normal diagnostic result because the sensing element responds to both the self-driving and external input. For example, even if the sensor is normal, if the sensor output exceeds a prescribed threshold because of an external impact applied during the self-diagnosis, it makes an erroneous decision of being abnormal.

In addition, according to the technique disclosed in Patent Document 2, although the foregoing erroneous decision can be avoided because the filter circuit is also diagnosed besides the acceleration sensor, it does not set the filter circuit for diagnosis. Furthermore, according to the technique disclosed in Patent Document 3, when it conducts the self-diagnosis by comparing the two sensors, it has a problem of being unable to detect an abnormality occurring in an offset circuit such as a power circuit because it employs relative comparison.

According to the conventional techniques including the techniques disclosed in the foregoing Patent Documents 1-3, they carry out the diagnosis by comparing the sensor output itself at the self-driving with the prescribed threshold. Accordingly, when an external force affecting the sensing is applied from outside during the self-diagnosis, the sensors cannot obtain a normal diagnostic result because they respond to both the self-driving and external force.

More specifically, even if the sensors are normal, if they exceed the prescribed threshold during the self-diagnosis because of the external force (such as an impact occurring when closing a door of a vehicle), they will make an erroneous decision of abnormality. On the contrary, even if the sensors are in an abnormal state of being unable to operate by the self-driving, if they stay within the prescribed threshold accidentally because the sensors respond to the external forces they will make an erroneous decision as being normal. It becomes a fatal problem when the sensors are applied to occupant protective apparatuses such as air bag firing devices.

The present invention is implemented to solve the foregoing problems. Therefore it is an object of the present invention to provide a vehicle state detecting device and an occupant protective apparatus having the same device capable of conducting self-diagnosis accurately even if an unnecessary external force which occurs in a vehicle and affects the sensing, is applied.

DISCLOSURE OF THE INVENTION

To solve the foregoing problems, the vehicle state detecting device in accordance with the present invention includes a sensor section for detecting behavior of a vehicle; an integration processing section for generating an output signal indicating a state of the vehicle by integrating physical quantity based on the sensor output; and a diagnostic section for supplying the sensor section with a self-driving signal, and for carrying out self-diagnosis of the sensor section by comparing the output signal from the integration processing section with upper and lower permissible limits preset for the output signal.

In addition, the vehicle state detecting device in accordance with the present invention, which is a vehicle state detecting device connected to an occupant protective apparatus with a diagnostic section, includes a sensor section for detecting the behavior of a vehicle, and an integration processing section for generating an output signal indicating a state of the vehicle by integrating physical quantity based on the sensor output; and is configured in such a manner as to start the self-diagnosis operation of the sensor which supplies, in response to the self-driving signal fed from the diagnostic section to the sensor section, the diagnostic section with the output signal from the integration processing section, and which compares the output signal from the diagnostic section with the preset upper and lower permissible limits.

An occupant protective apparatus in accordance with the present invention has a vehicle state detecting device as defined in any one of claims 1-5, which includes a sensor for detecting the behavior of a vehicle, and carries out self-diagnosis of the sensor by generating an output signal indicating a state of the vehicle by integrating physical quantity based on the sensor output, and by comparing the output signal with preset upper and lower permissible limits which are set in advance for the output signal obtained from the integration processing section by supplying the sensor with a self-driving signal; and a deciding section for making a decision as to necessity for ignition by comparing the output signal from the vehicle state detecting device with a preset ignition threshold of a squib.

According to the present invention, it is possible to provide the vehicle state detecting device and the occupant protective apparatus having the same device which can carry out the self-diagnosis accurately even if the unnecessary external force which occurs in the vehicle and affects the sensing is applied.

BEST MODE FOR CARRYING OUT THE INVENTION

The best mode for carrying out the invention will now be described with reference to the accompanying drawings to explain the present invention in more detail.

Embodiment 1

Figure 1:
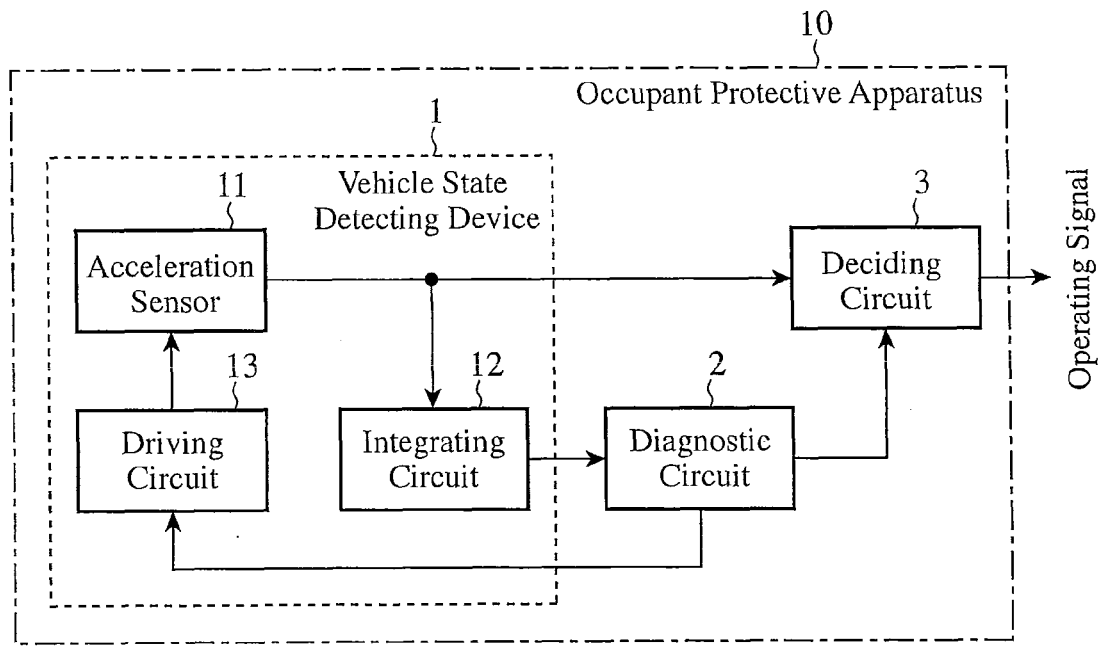
FIG. 1 is a block diagram showing an internal configuration of a vehicle state detecting device and an occupant protective apparatus having the same device of an embodiment 1 in accordance with the present invention.

FIG. 1 is a block diagram showing an internal configuration of a vehicle state detecting device and an occupant protective apparatus having the same device of an embodiment 1 in accordance with the present invention.

As shown in FIG. 1, an occupant protective apparatus 10 comprises a vehicle state detecting device 1, a diagnostic circuit 2 and a deciding circuit 3.

The vehicle state detecting device 1 comprises an acceleration sensor 11, for example, serving as a sensor section for detecting the behavior of the vehicle; an integrating circuit 12 serving as an integration processing section for integrating the physical quantity based on the output of the acceleration sensor 11 and for generating an output signal indicating the state of a vehicle; and a driving circuit 13 serving as a driving section for supplying the acceleration sensor 11 with a self-driving signal at a time of self-diagnosis of the acceleration sensor 11.

According to the self-driving signal fed from the driving circuit to the acceleration sensor 11 of the vehicle state detecting device 1, the diagnostic circuit 2 carries out the self-diagnosis of the acceleration sensor 11 by comparing the output signal acquired from the integrating circuit 12 with upper and lower permissible limits preset with respect to the output signal, and supplies the result to an igniting circuit not shown via the deciding circuit 3.

Incidentally, the foregoing acceleration sensor 11, integrating circuit 12 and driving circuit 13 are mounted on the same board (sensor board), but the diagnostic circuit 2 is mounted on another board.

In addition, when conducting the foregoing self-diagnosis, the driving circuit 13 supplies the acceleration sensor 11 with the self-driving signal (self-diagnostic pulse) having driving intensity and driving duration that will not affect the diagnostic result of the diagnostic circuit 2 even if an unnecessary external force that will affect the behavior of the vehicle detection by the acceleration sensor 11 is applied. As for the self-diagnostic pulse, it will be described later.

Furthermore, the deciding circuit 3 has a function as a deciding section for making a decision as to the necessity for the ignition by comparing the output signal acquired from the vehicle state detecting device 1 with a preset ignition threshold of a squib. Incidentally, if the diagnostic result of the diagnostic circuit 2 indicates the abnormality, the foregoing deciding operation by the deciding circuit 3 can be inhibited.

Incidentally, although the acceleration sensor 11 with a structure capable of self-driving of the sensing element is used as the sensor section, an angular velocity sensor with the same structure or a pressure sensor can also be employed. In addition, the term "self-diagnosis", refers to diagnosis of the sensor operation carried out by providing the sensing element in the acceleration sensor 11 with a separate driving element, for example, by operating the sensing element (diaphragm) in a simulated manner by a fixed amount by inputting an electric signal to the driving element from the driving circuit 13, and by making a decision by the diagnostic circuit 2 as to whether the sensor signal output in response to the operation is a response corresponding to the self-driving or not.

Here, the point is to conduct the self-diagnosis accurately in spite of the unnecessary external force which occurs in the vehicle and affects the sensing. The term "unnecessary external force which occurs in the vehicle and affects the sensing" means, when the sensor section is composed of the acceleration sensor 11, for example, an impact produced by closing a door of the vehicle or vibration caused while the vehicle is running, or means, when the sensor section is composed of the angular velocity sensor, shaking or the like of the vehicle occurring at a time when an occupant gets on and off or while the vehicle is running.

Since the external forces are all vibration components, they have characteristics of becoming zero when they undergo time integral. Accordingly, the configuration, which conducts the self-driving of the acceleration sensor 11 continuously by the self-diagnostic pulse generated by the driving circuit 13 for rather long duration of about a time period in which the vibration components converge (such as several tens to several hundreds of milliseconds), for example, and which compares the result of integrating the output of the acceleration sensor 11 by the integrating circuit 12 with the preset upper and lower permissible limits (threshold) by the diagnostic circuit 2 to conduct the diagnosis, can cancel out the unnecessary vibration components and remove their effect.

Incidentally, if the integrating circuit 12 is composed of a digital circuit, the external force cannot be canceled out even if it consists of vibration components if the sampling frequency of the digital circuit is synchronized with the frequency components of the external force, which requires a high rate sampling frequency and is not practical. Accordingly, it is assumed here that the integrating circuit 12 is composed of an analog circuit.

Furthermore, the driving intensity (self-diagnostic pulse) and driving duration of the acceleration sensor 11 are adjusted here to be set in such a manner that the integral value of the sensor output in response to the self-diagnostic pulse exceeds the ignition threshold of the squib in the occupant protective apparatus 10 such as an air bag, that is, exceeds the sensor response caused by an event such as a collision, overturn and rollover of a vehicle, thereby surely distinguishing the response to the self-diagnostic pulse from the external force applied to the sensor in a normal state. More specifically, even if the external force such as that produced when an occupant hits a bag on the vehicle during the self-diagnosis is applied, since it is clearly smaller than the threshold at which the occupant protective apparatus operates, it has little effect on the sensor response to the self-driving. Thus, the self-diagnosis does not suffer an erroneous decision.

According to the vehicle state detecting device and the occupant protective apparatus having the same device of the foregoing embodiment 1, they can carry out the diagnosis without being affected by an externally input impact or vibration components such as noise by making a decision by comparing the time integral output signal via the integrating circuit 12 with the prescribed deciding threshold. In addition, the self-driving, which is carried out on the assumption that the preset upper and lower permissible limits (threshold) are higher than the operation threshold (ignition threshold) of the occupant protective apparatus 10, makes it possible to clearly distinguish from the external input with a level that will not cause the occupant protective apparatus 10 to operate.

Embodiment 2

Figure 2:
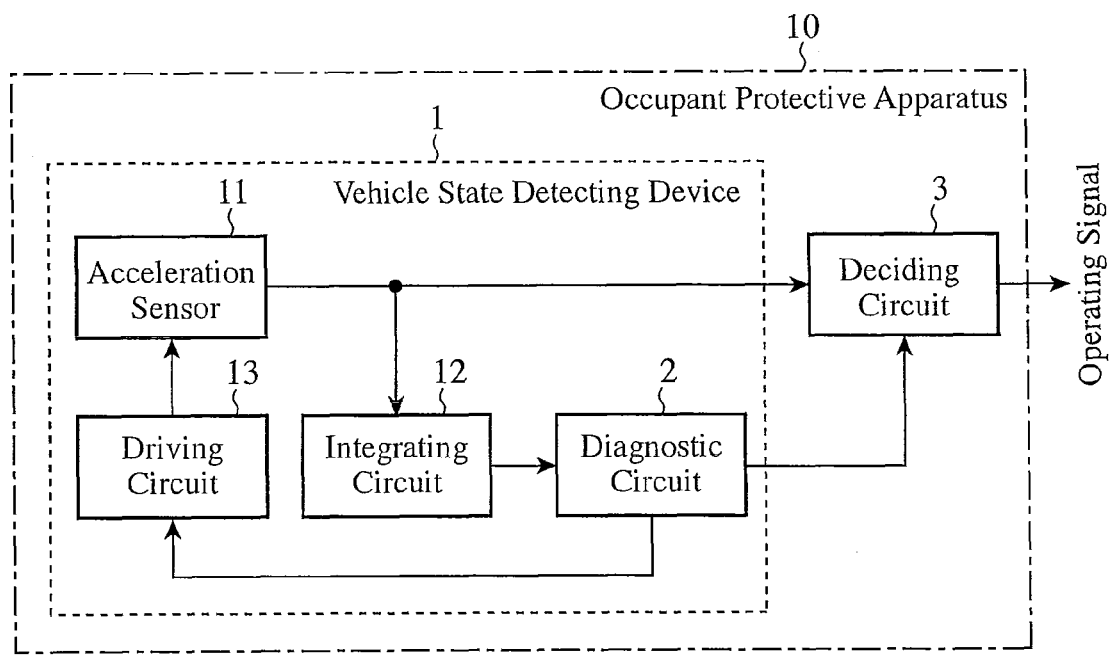
FIG. 2 is a block diagram showing an internal configuration of a vehicle state detecting device and an occupant protective apparatus having the same device of an embodiment 2 in accordance with the present invention.

FIG. 2 is a block diagram showing an internal configuration of a vehicle state detecting device and an occupant protective apparatus having the same device of an embodiment 2 in accordance with the present invention.

In FIG. 2, the configuration differs from the embodiment 1 shown in FIG. 1 in that the diagnostic circuit 2 is moved into the vehicle state detecting device 1. Thus, the diagnostic circuit 2 is mounted on the same board (sensor board) on which the acceleration sensor 11, integrating circuit 12 and driving circuit 13 are mounted. As for the functions of the individual components, since they are the same as those of the embodiment 1, their description will be omitted here to avoid duplicate explanation.

According to the vehicle state detecting device and the occupant protective apparatus having the same device of the embodiment 2, since the diagnostic circuit 2 is included in the vehicle state detecting device 1, the vehicle state detecting device 1 (sensor board) becomes a feature-rich device, which enables differentiation from other apparatuses. In addition, since the occupant protective apparatus is released from the diagnostic load of the sensor, it can improve its throughput, leading to the improvement of its performance.

Embodiment 3

Figure 3:
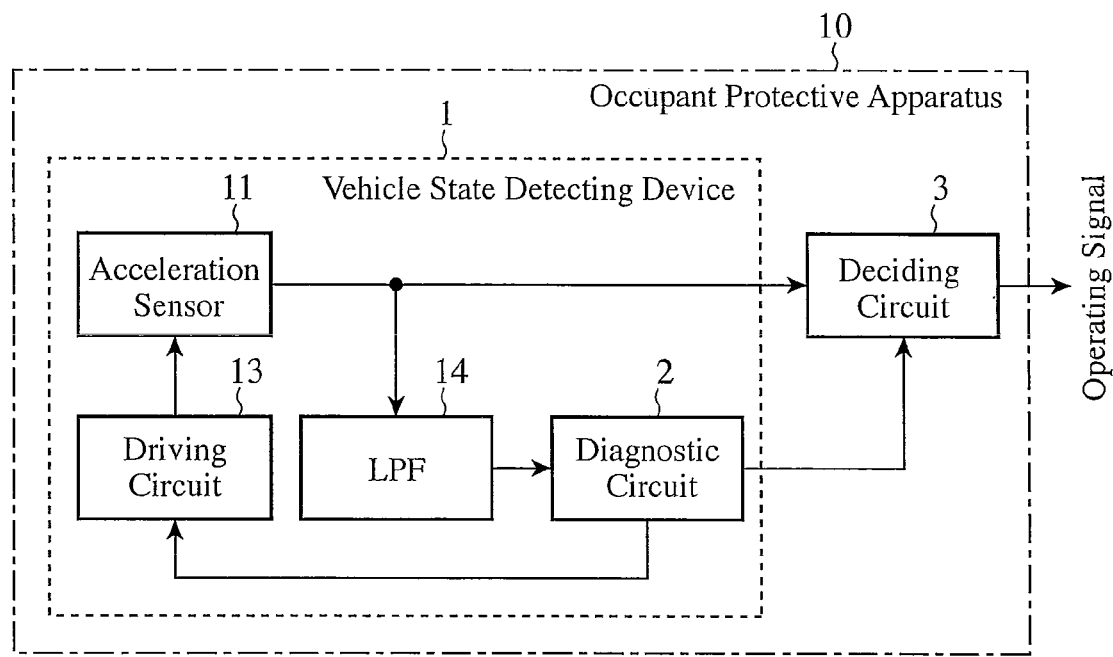
FIG. 3 is a block diagram showing an internal configuration of a vehicle state detecting device and an occupant protective apparatus having the same device of an embodiment 3 in accordance with the present invention.

FIG. 3 is a block diagram showing an internal configuration of a vehicle state detecting device and an occupant protective apparatus having the same device of an embodiment 3 in accordance with the present invention.

In FIG. 3, the configuration differs from the embodiment 2 shown in FIG. 2 in that a low-pass filter (simply called LPF 14 from now on) having a time constant smaller enough than the time constant of the integrating circuit 12 is employed instead of the integrating circuit 12. Just as the integrating circuit 12, the LPF 14 has functions of generating the output signal indicating the state of the vehicle by integrating the physical quantity based on the output of the acceleration sensor 11, and supplying it to the deciding circuit 3 and the diagnostic circuit 2.

Figure 4:
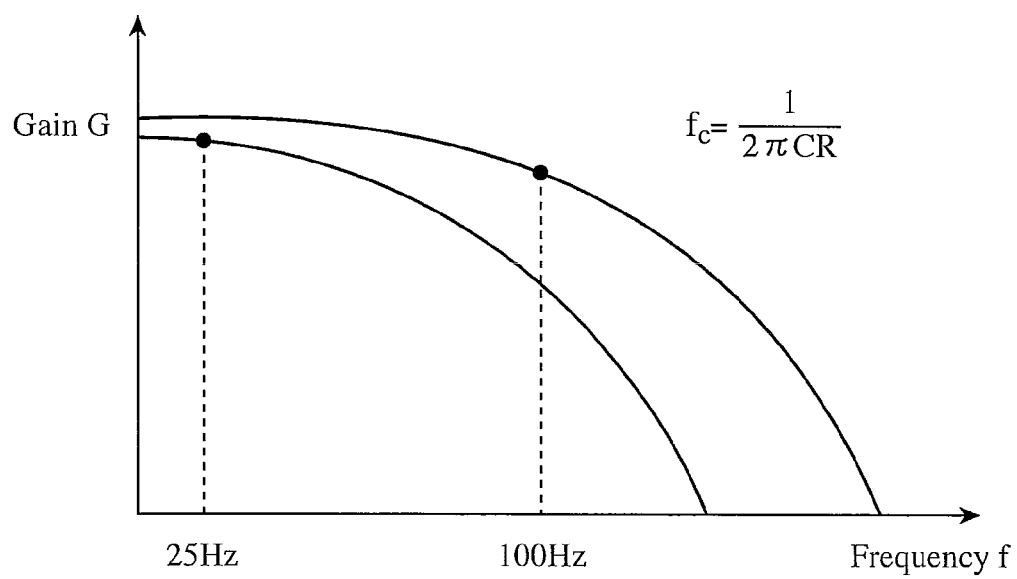
FIG. 4 is a diagram showing frequency characteristics of an LPF used in the vehicle state detecting device and the occupant protective apparatus having the same device of the embodiment 3 in accordance with the present invention.

FIG. 4 shows frequency characteristics of the LPF 14, in which the horizontal axis indicates frequency and vertical axis indicates gain. For example, the self-diagnosis becomes possible without being affected by an external impact by determining the driving duration by employing the LPF 14 with the cutoff frequency of 100 Hz instead of the integrating circuit 12 with the cutoff frequency $f_c$ ($f_c = 1/2\pi CR$) of 400 Hz, by generating the self-driving signal (self-diagnostic pulse) with a large driving intensity, and by supplying it to the acceleration sensor 11.

Figure 5:
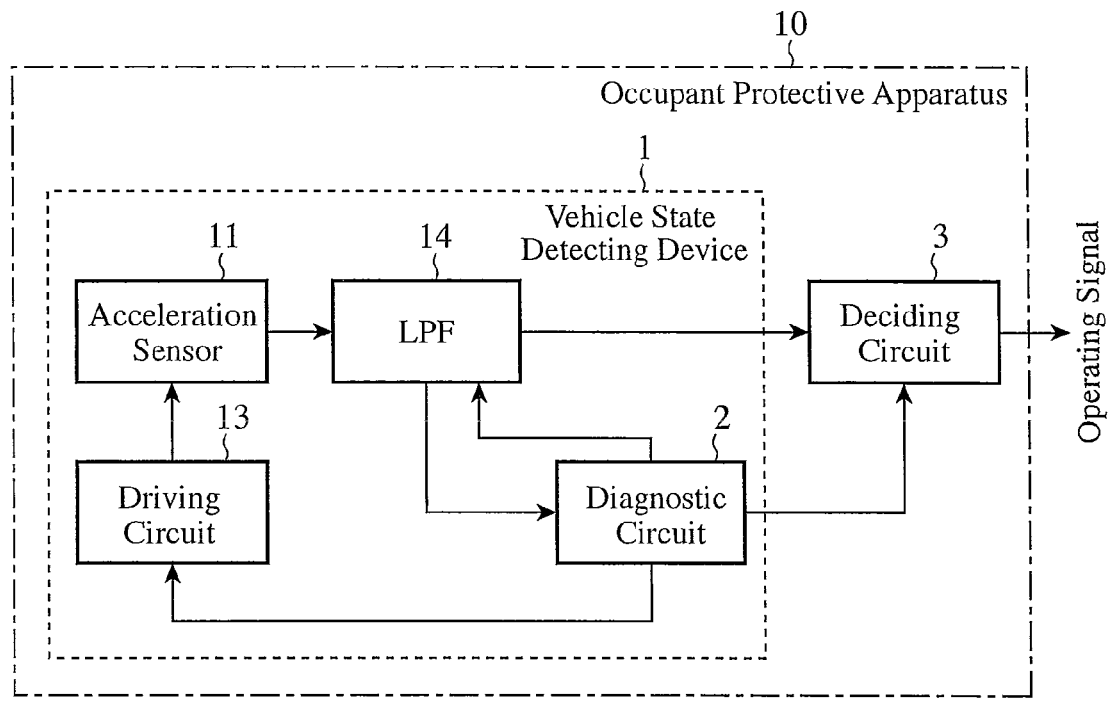
FIG. 5 is a diagram showing a variation of the vehicle state detecting device and the occupant protective apparatus having the same device of the embodiment 3 in accordance with the present invention.

Furthermore, when using the LPF 14, it is also possible to connect the output of the LPF 14 to both the diagnostic circuit 2 and deciding circuit 3 as shown in a variation of FIG. 5, and to carry out switching control of the time constant of the LPF 14 between the normal operation mode and self-diagnosis mode.

According to the vehicle state detecting device and the occupant protective apparatus having the same device of the embodiment 3, the LPF 14 employed as a substitute for the integrating circuit 12 can be used for both the diagnostic circuit 2 and deciding circuit 3 in common by only switching the cutoff frequency, thereby being able to contribute to the reduction in the number of components and cost.

Figure 6:
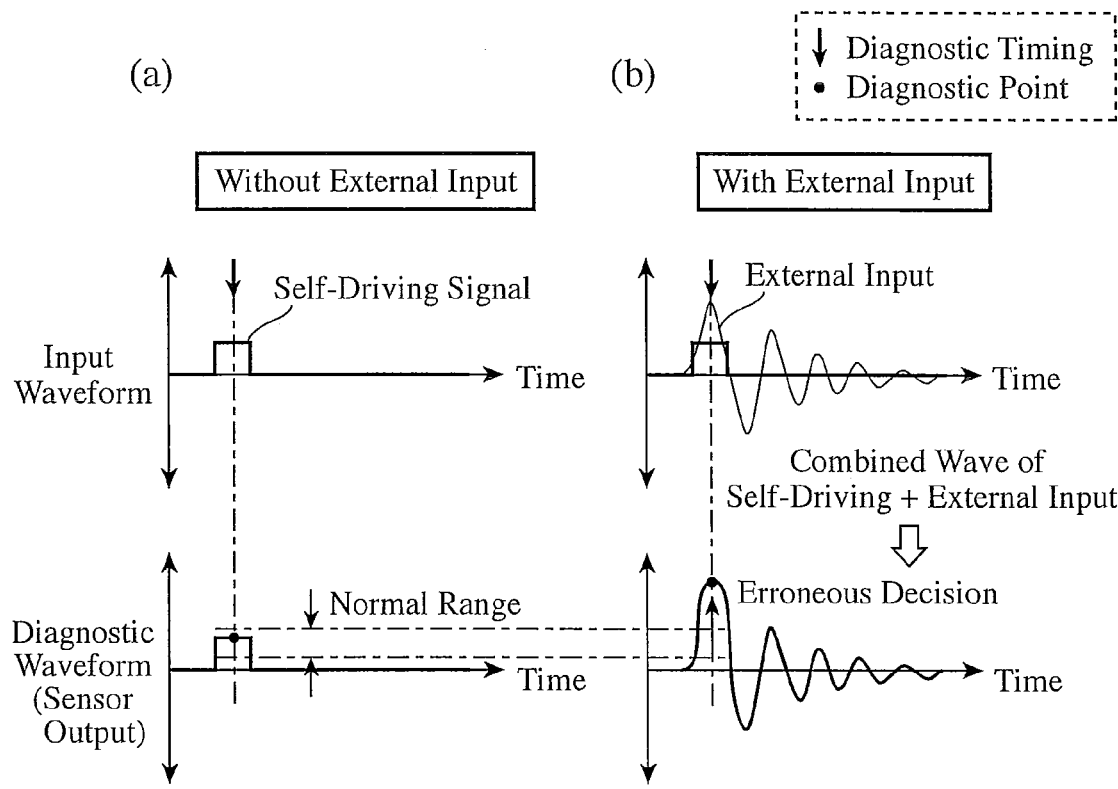
FIG. 6 is a diagram showing the diagnostic operation of the occupant protective apparatuses of the embodiments 1-3 in accordance with the present invention in contrast to a conventional example.
Figures 7, 8:
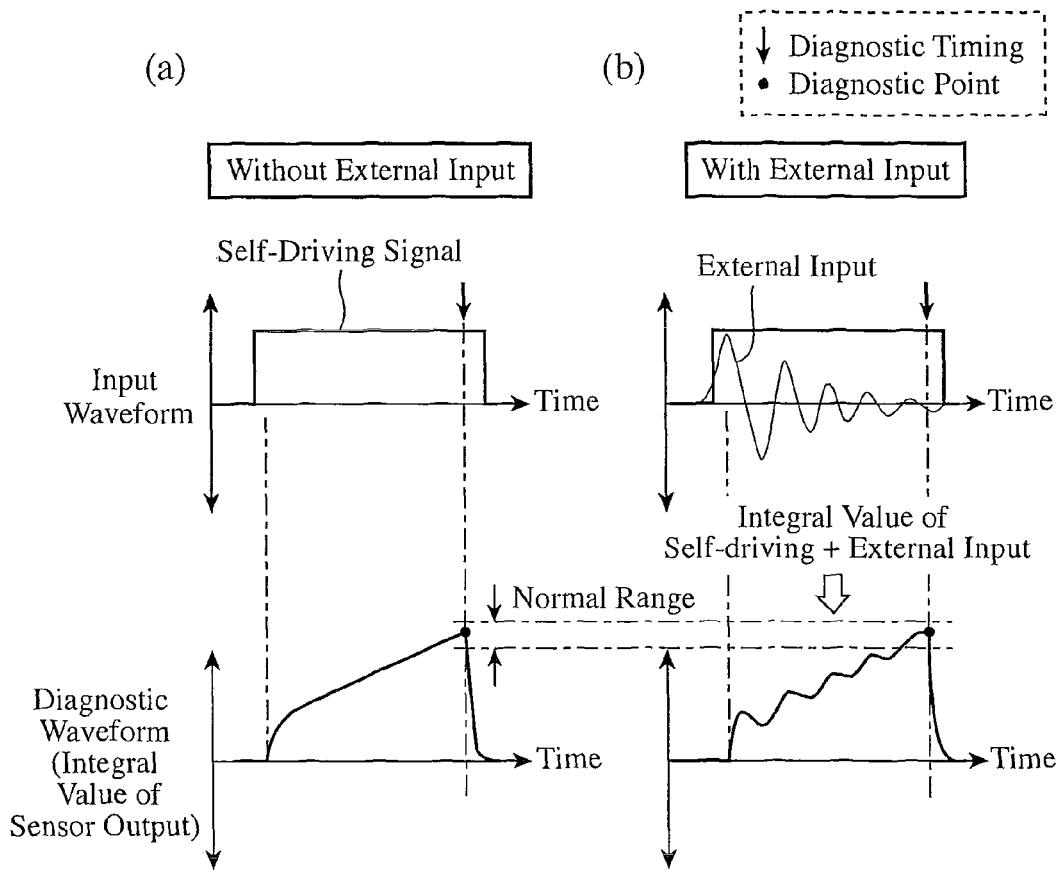
FIG. 7 is a diagram showing the diagnostic operation of the occupant protective apparatuses of the embodiments 1-3 in accordance with the present invention in contrast to a conventional example.
FIG. 8 is a diagram showing desirable driving intensity and driving duration in a table when the sensor mounted on the vehicle state detecting device is assumed to be an acceleration sensor.

FIG. 6 and FIG. 7 are diagrams shown for the purpose of deepening the understanding of the diagnostic operation of the occupant protective apparatus of the embodiments 1-3 in accordance with the present invention: the conventional technique that can make an erroneous decision when the external input is applied (FIG. 6); and the embodiments 1-3 in accordance with the present invention that can carry out self-diagnosis accurately regardless of the external input (FIG. 7).

FIG. 6 and FIG. 7 each show on time axes the input wave forms and the sensor outputs which are diagnostic wave forms in a case (a) where the external input is not applied, and a case (b) where it is applied, in which arrows (↓) indicate a start timing and indicates a point of diagnosis.

As shown in FIGS. 6(*a*) and 6(*b*), the conventional technique compares the sensor output itself at the time of the self-driving with the prescribed threshold (normal range). If the external force that will affect the sensing is applied from outside during the self-diagnosis (external input is present), since the sensor responds to both the self-driving and external force, a combined wave of the self-driving and external input is generated so that the normal diagnostic result cannot be obtained (erroneous decision). More specifically, even if the sensor is normal, if the sensor exceeds the prescribed threshold owing to the external force (such as an impact generated by closing a door of the vehicle) applied during the self-diagnosis, an erroneous decision is made as abnormal. On the contrary, even if the sensor is in an abnormal state of being unable to operate by the self-driving, if the sensor responds to the external force and stays within the prescribed threshold accidentally, an erroneous decision is made as normal.

On the other hand, the foregoing embodiments 1-3 in accordance with the present invention can carry out the self-diagnosis accurately as shown in FIGS. 7(*a*) and 7(*b*) even if the unnecessary external force which occurs in the vehicle and affects the sensing is applied. Here, the term "the unnecessary external force which occurs in the vehicle and affects the sensing" means, when the sensor is an acceleration sensor, for example, an impact produced by closing a door of the vehicle, or vibration or the like caused while the vehicle is running, or means, when the sensor is an angular velocity sensor, shaking of the vehicle or the like occurring at a time when an occupant gets on and off or when the vehicle is running. Since the external forces are all vibration components, they have characteristics of becoming zero when they undergo time integral.

Accordingly, if the diagnosis is carried out using a narrow sensor output as in the conventional technique, the external force can affect the diagnostic result. However, since the foregoing embodiments conduct the self-driving continuously for rather long duration (such as several tens to several hundreds of milliseconds, for example), and compares the result of integrating the output with the preset upper and lower permissible limits (threshold) to conduct the diagnosis, they can cancel out the unnecessary vibration components and remove their effect.

In addition, in the conventional technique, the self-driving of the sensor aims at checking the sensor functions, and the driving intensity or driving duration is not particularly defined. However, in the present invention, the driving intensity and driving duration are adjusted to be set (at a normal range) in such a manner that the integral value of the sensor output in response to the self-diagnostic pulse exceeds the operation threshold of the occupant protective apparatus 10, that is, exceeds the sensor response caused by an event such as a collision, overturn and rollover of a vehicle, thereby enabling sure distinction between the response to the self-diagnostic pulse and the external force applied to the sensor in a normal state.

More specifically, even if the external force such as that produced when an occupant hits a bag on the vehicle during the self-diagnosis is applied, since it is clearly smaller than the threshold at which the occupant protective apparatus operates, it has little effect on the sensor response to the self-driving. Thus, the self-diagnosis does not suffer an erroneous decision.

FIG. 8 shows in a table the desirable driving intensity and driving duration when the sensor mounted on the vehicle state detecting device 1 is assumed to be the acceleration sensor 11.

When defining the operation threshold of the occupant protective apparatus 10 in terms of the velocity component obtained as a result of the time integral of the acceleration (30 km/h or more, for example), it is necessary to adjust the driving intensity and driving duration (50 G-20 ms) in such a manner as to set the integral value for the self-driving at a value exceeding the velocity component, at 35 km/h, for example.

As described above, the present invention can carry out the fault diagnosis without being affected by the vibration components (impact, noise and the like) input from outside by making a decision by comparing the output level passing through the time integral of the integrating circuit 12 with the prescribed threshold at the time of the self-diagnosis in the vehicle state detecting device 1 having the sensor such as the acceleration sensor, angular velocity sensor, pressure sensor or the like, for example. In addition, the self-driving carried out in such a manner that the threshold to be set becomes higher than the operation threshold of the occupant protective apparatus 10 makes it possible to clearly distinguish from the external input that will not operate the occupant protective apparatus 10.

The foregoing vehicle state detecting device 1 is placed in the occupant protective apparatus 10 of the vehicle such as an air bag. The vehicle state detecting device 1 detects the vehicle state, and the deciding circuit 3 placed in the occupant protective apparatus 10 can carry out the control such as inflating the air bag (igniting squib) and the like. Thus, the self-diagnosis function of the sensor of the vehicle state detecting device 1 can check without being affected by the external force as to whether the sensor for detecting the behavior of the vehicle operates normally in advance, thereby being able to provide the highly reliable occupant protective apparatus 10.

Incidentally, as for the diagnosis conducted by the diagnostic circuit 2, either the vehicle state detecting device 1 or the occupant protective apparatus 10 can perform it. In addition, as for the functions of the component blocks of the foregoing vehicle state detecting device 1 and occupant protective apparatus 10, they can be implemented by hardware in their entirety, or at least part of them can be implemented by software. For example, the data processing in the diagnostic circuit 2 can be carried out by a single or a plurality of programs on a microprocessor, or at least its part can be performed by hardware.

Incidentally, although the foregoing embodiments describe the cases where the vehicle state detecting device in accordance the present invention is applied to the occupant protective apparatus, the vehicle state detecting device is also applicable to a pedestrian protective device described in Japanese Patent Laid-Open No. 8-230610/1996, for example, to achieve the same effect and advantages, that is, the accurate self-diagnosis even if the unnecessary external force which occurs in the vehicle and affects the sensing is applied.

INDUSTRIAL APPLICABILITY

As described above, the vehicle state detecting device in accordance with the present invention carries out the self-diagnosis of the sensor by comparing, according to the output of the sensor for detecting the behavior of the vehicle, the signal output as a result of integrating the physical quantity with the preset upper and lower permissible limits, thereby being able to perform the accurate self-diagnosis even if the external force is applied. Accordingly, it is suitable for applications to the vehicle state detecting device and the like in the air bag system of a vehicle.

What is claimed is:

1. An occupant protective apparatus comprising:
   a sensor that detects a behavior of a vehicle and generates a sensor output;
   an integration processor that generates an output signal indicating a state of the vehicle by integrating physical quantity based on the sensor output and thereby reducing an effect of an unnecessary external force which is a vibration component;
   a diagnoser that supplies the sensor with a pulsed self-driving signal, and carries out self-diagnosis of the sensor by comparing the output signal from the integration processor in response to the pulsed self-driving signal with upper and lower permissible limits preset for the output signal; and
   a decision maker that makes a decision as to necessity for ignition of the occupant protective apparatus by comparing the sensor output to a threshold, said decision maker receiving a result of the self-diagnosis from said diagnoser via a first path, said sensor output being transmitted from said sensor to said decision maker via a second path that includes neither said integration processor nor said diagnoser.

2. The occupant protective apparatus according to claim 1, wherein the sensor and the integration processor are mounted on a same board, and the diagnoser is mounted on another board.

3. The occupant protective apparatus according to claim 1, wherein the sensor, the integration processor and the diagnoser are mounted on a same board.

4. The occupant protective apparatus according to claim 1, further comprising:

a driver that generates the pulsed self-driving signal as a pulse having a driving intensity and a driving duration based on the operational threshold according to which the behavior of the vehicle is detected, wherein the driving intensity and the driving duration are set so that an external force, which otherwise affects the behavior detection by the sensor when applied, will not affect a diagnostic result by the diagnoser if applied during the self-diagnosis.

5. The occupant protective apparatus according to claim 1, wherein the integration processor comprises an analog integrating circuit.

6. The occupant protective apparatus according to claim 1, wherein the integration processor comprises a low-pass filter.

7. The occupant protective apparatus according to claim 1, wherein the threshold is an ignition threshold of a squib.

8. The occupant protective apparatus according to claim 7, wherein the vehicle state detecting device sets the upper and lower permissible limits higher than the ignition threshold.

9. A pedestrian protective apparatus comprising:

a sensor that detects a behavior of a vehicle and generates a sensor output;

an integration processor that generates an output signal indicating a state of the vehicle by integrating physical quantity based on the sensor output and thereby reducing an effect of unnecessary external force which is a vibration component;

a diagnoser that supplies the sensor with a pulsed self-driving signal, and carries out self-diagnosis of the sensor by comparing the output signal from the integration processor in response to the pulsed self-driving signal with upper and lower permissible limits preset for the output signal; and a decision maker that makes a decision as to necessity for ignition of the pedestrian protective apparatus by comparing the sensor output to a threshold, said decision maker receiving a result of the self-diagnosis from said diagnoser via a first path, said sensor output being transmitted from said sensor to said decision maker via a second path that includes neither said integration processor nor said diagnoser.

10. The pedestrian protective apparatus according to claim 9, wherein the threshold is an ignition threshold of a squib.

\* \* \* \* \*